United States Patent
Boxberg et al.

(10) Patent No.: US 9,680,351 B2
(45) Date of Patent: Jun. 13, 2017

(54) ELECTRICAL MACHINE HAVING COOLING FEATURES

(71) Applicant: Ingersoll-Rand Company, Davidson, NC (US)

(72) Inventors: Fredrik Andreas Boxberg, Vantaa (FI); Petri Juhani Maki-Ontto, Espoo (FI); Juha Tuomas Saari, Espoo (FI)

(73) Assignee: INGERSOLL-RAND COMPANY, Davidson, NC (US)

( * ) Notice: Subject to any disclaimer, the term of this patent is extended or adjusted under 35 U.S.C. 154(b) by 310 days.

(21) Appl. No.: 14/214,777

(22) Filed: Mar. 15, 2014

(65) Prior Publication Data

US 2014/0265667 A1     Sep. 18, 2014

Related U.S. Application Data

(60) Provisional application No. 61/801,101, filed on Mar. 15, 2013, provisional application No. 61/802,243, filed on Mar. 15, 2013.

(51) Int. Cl.
| | |
|---|---|
| *H02K 1/32* | (2006.01) |
| *H02K 9/02* | (2006.01) |
| *H02K 5/20* | (2006.01) |
| *H02K 9/04* | (2006.01) |

(52) U.S. Cl.
CPC ............... *H02K 9/02* (2013.01); *H02K 1/32* (2013.01); *H02K 5/20* (2013.01); *H02K 9/04* (2013.01)

(58) Field of Classification Search
CPC .. H02K 9/02; H02K 1/32; H02K 9/00; H02K 9/04; H02K 1/20; H02K 9/06; H02K 5/20

USPC ............... 310/59, 60 A, 60 R, 61, 62, 63, 52
See application file for complete search history.

(56) References Cited

U.S. PATENT DOCUMENTS

| | | | |
|---|---|---|---|
| 1,819,228 A | 8/1931 | Coates | |
| 1,882,487 A | 10/1932 | Dupont | |
| 2,947,892 A | 8/1960 | Inculet et al. | |
| 3,116,429 A * | 12/1963 | Harrington | H02K 1/20 310/64 |
| 3,701,911 A | 10/1972 | Hallerback | |
| 3,783,318 A | 1/1974 | Widstrand | |

(Continued)

FOREIGN PATENT DOCUMENTS

| | | | |
|---|---|---|---|
| DE | WO 2010115539 A1 * | 10/2010 | ............... H02K 1/20 |
| JP | H0648355 U * | 6/1994 | |
| JP | 2004312898 A * | 11/2004 | |

OTHER PUBLICATIONS

JPH0648355U (English Translation).*
JP 2004312898 (English Translation).*
Egger et al. (WO 2010115539 A1, English Translation).*

*Primary Examiner* — Michael Andrews
*Assistant Examiner* — Alexander Moraza
(74) *Attorney, Agent, or Firm* — Taft Stettinius & Hollister LLP

(57) ABSTRACT

An electrical machine has passages in the rotor. The passages have an inlet port and an exit port disposed at different locations. The passages remove heat from the electrical machine during operation. Another embodiment is an electrical machine rotor. The rotor has passages that remove heat from an electrical machine during operation. Other embodiments include apparatuses, systems, devices, hardware, methods, and combinations for electrical machines and the cooling of electrical machine rotors and/or stators.

18 Claims, 4 Drawing Sheets

(56) References Cited

U.S. PATENT DOCUMENTS

| | | | |
|---|---|---|---|
| 4,275,321 A * | 6/1981 | Shimamoto | H02K 9/02 |
| | | | 310/59 |
| 5,173,629 A | 12/1992 | Peters | |
| 5,365,132 A | 11/1994 | Hann et al. | |
| 5,703,421 A | 12/1997 | Durkin | |
| 5,859,483 A * | 1/1999 | Kliman | H02K 1/20 |
| | | | 310/216.004 |
| 5,861,700 A | 1/1999 | Kim | |
| 5,986,366 A | 11/1999 | Bailey et al. | |
| 5,994,804 A | 11/1999 | Grennan et al. | |
| 6,437,468 B2 | 8/2002 | Stahl et al. | |
| 6,740,993 B2 | 5/2004 | Greubel et al. | |
| 6,815,849 B2 | 11/2004 | Serizawa et al. | |
| 7,141,898 B2 | 11/2006 | Thiot | |
| 7,514,827 B2 | 4/2009 | Hall | |
| 7,633,194 B2 | 12/2009 | Dawsey et al. | |
| 7,872,392 B2 | 1/2011 | Haldemann et al. | |
| 8,072,100 B2 | 12/2011 | Monzel | |
| 8,159,094 B2 | 4/2012 | Ruffing et al. | |
| 2004/0036367 A1 | 2/2004 | Denton et al. | |
| 2006/0066156 A1 * | 3/2006 | Dong | H02K 9/20 |
| | | | 310/54 |
| 2007/0013241 A1 | 1/2007 | Schiferl et al. | |
| 2007/0228847 A1 | 10/2007 | Kim | |
| 2010/0231067 A1 * | 9/2010 | Ruffing | H02K 1/32 |
| | | | 310/61 |
| 2011/0181138 A1 * | 7/2011 | Matsumoto | H02K 1/32 |
| | | | 310/59 |
| 2013/0099607 A1 | 4/2013 | Lendenmann et al. | |

* cited by examiner

ELECTRICAL MACHINE HAVING COOLING FEATURES

CROSS REFERENCE TO RELATED APPLICATIONS

The present application claims benefit of U.S. Provisional Patent Application No. 61/801,101 filed Mar. 15, 2013, entitled COOLING OF A ROTOR OF A HIGH SPEED MOTOR; and claims the benefit of U.S. Provisional Patent Application No. 61/802,243 filed Mar. 15, 2013, entitled STATOR CORE AND METHOD OF MANUFACTURING HIGH-SPEED INDUCTION MOTORS, both of which are incorporated herein by reference.

FIELD OF THE INVENTION

The present invention relates to electrical machines having cooling features, and in particular, motors, generators and motor/generators having cooling features in the rotor and/or stator.

BACKGROUND

Electrical machines that have cooling features, and cooling features for electrical machines that effectively cool the electrical machines remain an area of interest. Some existing systems have various shortcomings, drawbacks, and disadvantages relative to certain applications. Accordingly, there remains a need for further contributions in this area of technology.

SUMMARY

One embodiment of the present invention is a unique electrical machine having passages in the rotor, wherein the passages have an inlet port and an exit port disposed at different locations, and remove heat from the electrical machine during operation. Another embodiment is an electrical machine rotor having passages that remove heat from an electrical machine during operation Other embodiments include apparatuses, systems, devices, hardware, methods, and combinations for electrical machines and the cooling of electrical machine rotors and/or stators. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
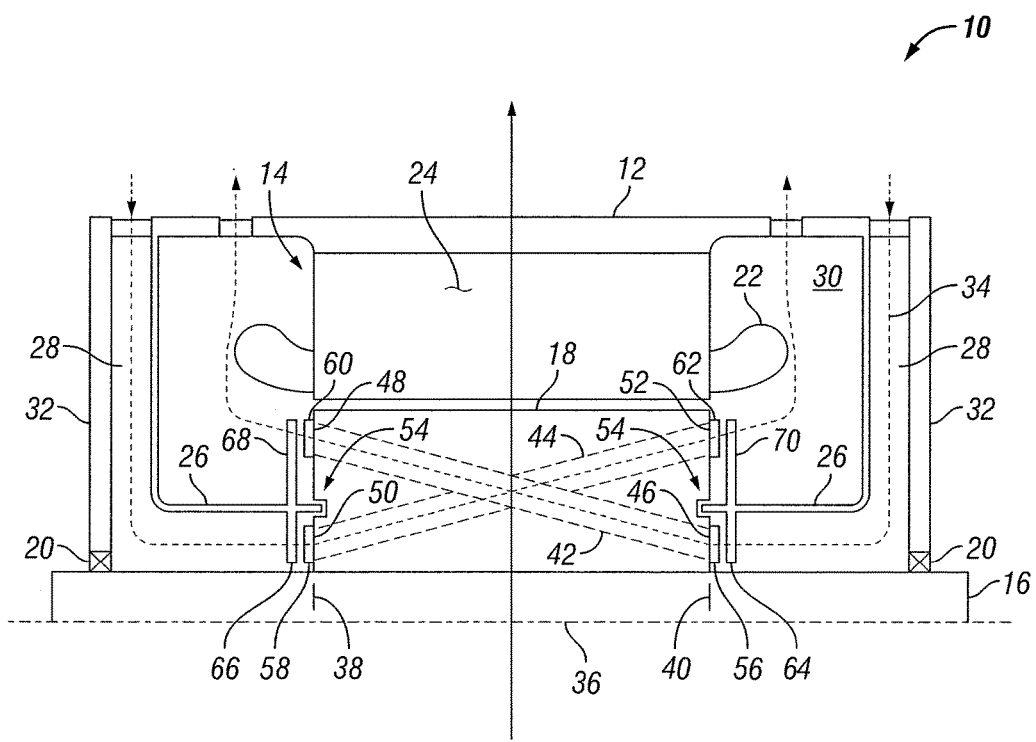
FIG. 1 schematically illustrates some aspects of a non-limiting example of an electrical machine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Embodiments of the present invention are directed to cooling features and schemes for cooling electrical machines, such as motors, generators and/or motor generators. In some, but not all embodiments, the electrical machines may be considered high-speed electrical machines. In some, but not all embodiments, the electrical machines may be induction machines or synchronous machines. The rotation of the electrical machine may be exploited for cooling in more than one manner, for example, by mounting a separate fan on the rotor shaft or by mounting or forming a conventional fan onto the rotor. However, such approaches may be cost prohibitive, and in the case of high-speed machines, may not be desirous, e.g., as they might generate more pressure or flow than is desired, or may experience more losses than are preferable, resulting in unnecessarily increased power requirements at the rotor.

In some embodiments, cooling is provided via the use of cooling passages in the rotor that effectively form a pump or compressor, e.g. an axial and/or centrifugal pump or compressor that induce flow through the rotor and in some embodiments, the stator as well. Some embodiments may generate lower pressures that are more suitable for high speed motors. The pressure may be easily adjusted in the manufacturing process of the rotor, e.g., by altering the positions of one or more openings in laminations in a laminated rotor that form the cooling passages in the rotor, or by altering the size of one or more of the openings to effectively function as an orifice to meter the flow of the cooling fluid (e.g., air). In some embodiments, the cooling scheme is symmetrical, e.g., wherein the cooling fluid flows in both directions, such as from each end to the opposite end of the rotor and/or stator, which in some embodiments may make the temperature distribution across the machine more homogeneous, and in some embodiments less power (pressure) may be needed for a desired volumetric flow of cooling fluid.

In some embodiments, the stator, e.g., the stator core yoke, may employ axial cooling channels extending therethrough. The cooling passages may be located near the stator slots so that the heat conduction distance is reduced. In some embodiments, the stator is laminated, and the cooling passages may be formed by forming openings in the laminations, and stacking the stator core in such a manner as to achieve the desired alignment between the openings to thereby form the cooling passages. In some embodiments, some of the openings in the laminations may be deflected or shifted relative to others, thereby forming turbulators that increase the heat transfer from the wall of the cooling passage to the cooling fluid.

Referring to the drawings, and in particular FIG. 1, some aspects of a non-limiting example of an electrical machine 10 in accordance with an embodiment of the present invention are schematically depicted. In one form, electrical machine 10 is a motor. In other embodiments, electrical machine 10 may be a generator or may be a motor/generator. In one form, electrical machine 10 is an induction motor. In other embodiments, electrical machine 10 may be a synchronous machine. In still other embodiments, electrical machine 10 may take other forms. In one form, electrical machine 10 is a high-speed electrical machine. In other embodiments, electrical machine 10 may operate at any speed suitable for the particular application. Electrical machine 10 includes a casing 12, a stator 14, a shaft 16, rotor 18 and bearings 20. Casing 12 is configured to house stator 14, shaft 16, rotor 18 and bearings 20. In one form, bearings 20 are mounted in casing 12, e.g., an end plate of casing 12. In other embodiments, bearings 20 may be mounted and coupled to casing 12 via one or more other structures. Bearings 20 are structured to radially support rotor 18, and to react rotor 18 thrust loads.

Stator 14 includes a plurality of stator windings 22 and a stator core 24. Rotor 18 is disposed radially inward of stator core 24. In one form, stator 14 circumferentially encompasses rotor 18, although in other embodiments, stator 14 may only partially encompass induction rotor 18, e.g., in the form of segments disposed circumferentially around stator 14. Rotor 18 is configured for electromagnetic cooperation with stator 14, e.g., to convert electrical power into mechanical power for delivery via shaft 16 in some embodiments and/or to convert mechanical power received from shaft 16 into electrical power for delivery via stator 14 in other embodiments.

Disposed within casing 12 adjacent to rotor 18 are flow guides 26, which form cooling fluid supply passages 28 and cooling fluid exhaust passages 30. In the illustrated embodiment, cooling fluid supply passages 28 are formed between rotor 18, shaft 16, flow guides 26 and end plates 32; and cooling fluid exhaust passages 30 are formed between rotor 18, stator 14, flow guides 26 and casing 12. In other embodiments, cooling fluid supply passages 28 and cooling fluid exhaust passages 30 may be formed by one or more other components and/or disposed in one or more other locations. Cooling fluid supply passages 28 and cooling fluid exhaust passages 30 are operative to respectively supply and discharge the cooling fluid 34, e.g., air, to and from rotor 18 and electrical machine 10.

Figure 2:
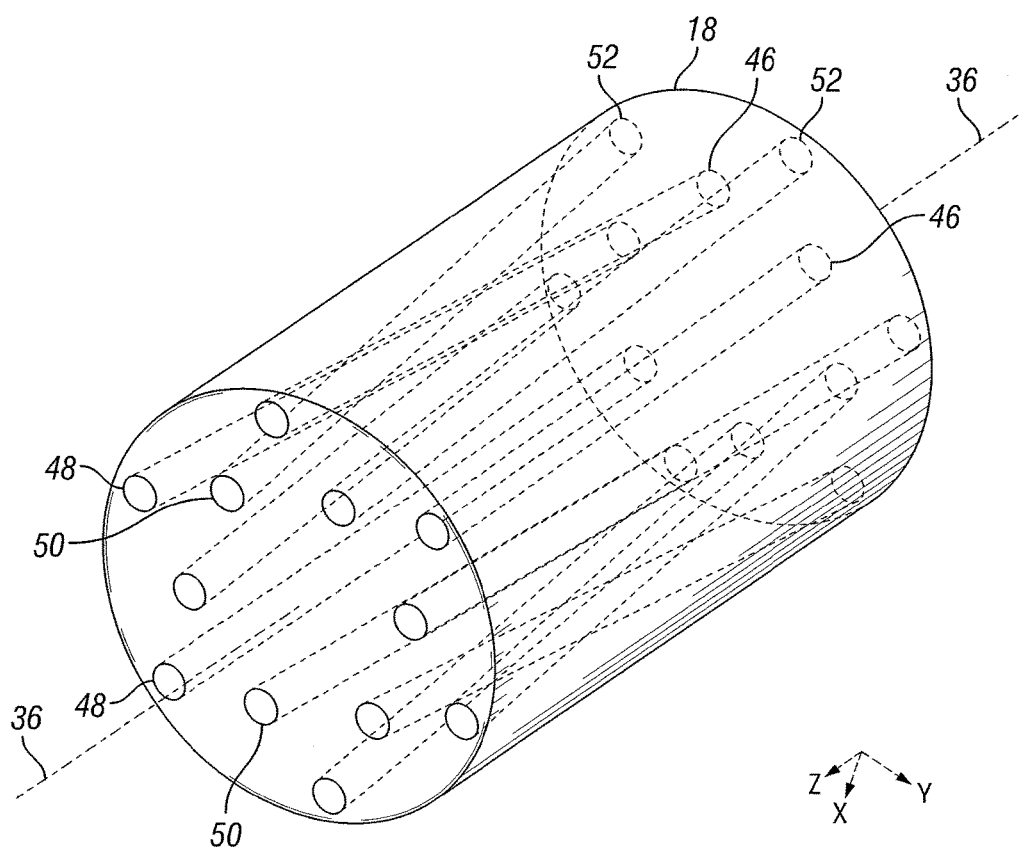
FIG. 2 schematically illustrates some aspects of a non-limiting example of the electrical machine rotor of FIG. 1 in accordance with an embodiment of the present invention.

Referring to FIG. 2 in conjunction with FIG. 1, some aspects of a non-limiting example of electrical machine 10 and rotor 18 in accordance with an embodiment of the present invention are schematically depicted. Rotor 18 extends axially along an axis of rotation 36 about which rotor 18 and shaft 16 rotate, e.g., between an axial position 38 and an axial position 40. Rotor 18 includes a plurality of cooling passages 42 extending therethrough. In some embodiments, such as the embodiment depicted in FIGS. 1 and 2, rotor 18 also includes a plurality of passages 44 extending therethrough. In view of the following description, it will become apparent to those skilled in the art that cooling passages 42 and 44 remove heat from rotor 18 during operation of the electrical machine. Cooling passages 42 include cooling fluid inlet ports 46 and cooling fluid discharge ports 48; and cooling passages 44 include cooling fluid inlet ports 50 and cooling fluid discharge ports 52. Inlet ports 50 and discharge ports 48 are disposed at axial position 38, and inlet ports 46 and discharge ports 52 are disposed at axial position 40. It will be understood that embodiments of the present invention are not limited to cooling passages that extend only between the end faces of an electrical machine rotor. For example, in other embodiments, inlet ports 50 and discharge ports 48, and inlet ports 46 and discharge ports 52 may be disposed at any desired axial position. In addition, in some embodiments, the cooling passages may extend only from one portion to another portion of the electrical machine rotor, not necessarily through the entire axial length of the electrical machine rotor.

For each respective passage 42 and 44, discharge ports 48 and discharge ports 52 are disposed radially outward of inlet ports 46 and inlet ports 50. As a result of this outer radial displacement of discharge ports 48, 52 relative to inlet ports 46, 50, the rotation of rotor 18 generates centrifugal or centripetal forces on the cooling fluid 34 disposed within passages 42 and 44, These forces impart a radially outward velocity to the cooling fluid disposed within cooling passages 42 and 44, thus forming a centrifugal pump or compressor that generates a pressure rise between inlet ports 46, 50 and discharge ports 48, 52, thereby pumping cooling fluid through passages 42 and 44 from inlet ports 46, 50 to discharge ports 48, 52, and thus pumping the cooling fluid through cooling passages 42 and 44, and hence providing cooling to rotor 18.

Electrical machine 10 includes seals 54, which are configured to prevent or reduce the recirculation of fresh and exhausted cooling fluid between the inlet ports 46, 50 and discharge ports 48, 52 on rotor 18. In one form, seals 54 are labyrinth seals. In other embodiments, seals 54 may be any contacting or noncontacting seal or flow discourager. In one form, seals 54 include tips extending from flow guides 26 into a groove in rotor 18. In other embodiments, seals 54 may be formed with other geometries, and may not be incorporated as part of flow guides 26.

In some embodiments, for each respective passage 42 and 44, inlet ports 46, 50 may be disposed at different circumferential positions than discharge ports 48, 52, i.e., wherein during the rotation of rotor 18, discharge ports may lead or may lag the inlet ports, by which rotor 18 effectively functions as an axial pumps or compressor, e.g., in such a manner that a shrouded fan does so. This relative positioning of inlet ports 46, 50 and discharge ports 48, 52 may be employed to augment the pressure rise generated across rotor 18 during operation, or to reduce the pressure rise.

In some embodiments, inlet ports 46, 50 and discharge ports 48, 52 may be at the same radial position, but may be located at different circumferential positions such that rotor 18 functions purely as an axial flow machine. Thus in various embodiments, the inlet ports and discharge ports of the cooling passages may be located so that rotor 18 effectively functions as a centrifugal pump/compressor, an axial pumps/compressor, both an axial and centrifugal pump/compressor, or may position the inlet ports and discharge ports such that the pressure rise generated by centrifugal/centripetal effects are reduced by those generated by axial flow effects, or may position the inlet ports and discharge ports such that the pressure rise generated by centrifugal/centripetal effects are reduced by those generated by axial flow effects.

In one form, cooling passages 42 and 44 extend linearly between their respective inlet and discharge ports. In other embodiments, cooling passages 42 and 44 may be geometrically configured, arranged or disposed in any suitable fashion. For example, in some embodiments, substantially all of one or more of the cooling passages may be horizontal, e.g., maintaining the same radial position along the bulk of the length of rotor 18, but having the inlet ports and discharge ports located at the different radial and/or axial positions in order to achieve the desired pressure rise across the cooling passages to achieve the desired level of pumping of the cooling fluid. One form, cooling passages 42 and 44 have a relatively constant cross-section area or flow area between their respective inlet ports and discharge ports. In other embodiments, the cross-sectional area or flow area may vary between their respective inlet ports and discharge ports in accordance with the needs of the particular application. In one form, cooling passages 42 and 44 each have a single inlet port and a single discharge port. In other embodiments, cooling passages 42 and 44 may each have more than one inlet port and/or discharge port.

In some embodiments, rotating and/or stationary guide vanes may be employed, e.g., to augment, control, or fine-tune the flow through cooling passages 42 and 44. For example, in the embodiment of FIG. 1, electrical machine 10 includes rotating inlet guide vanes 56 and 58, e.g., extending from rotor 18; rotating discharge guide vanes 60 and 62, e.g. extending from rotor 18; stationery inlet guide vanes 64 and 66, extending from flow guides 26; and stationery discharge guide vanes 68 and 70, e.g. extending from flow guides 26. In various embodiments, electrical machine 10 may include one or more of rotating inlet guide vanes, stationery inlet guide vanes, rotating discharge guide vanes, and stationary discharge guide vanes. Although guide vanes 56, 58, 60, 62, 64, 66, 68 and 70 extend from respective rotor 18 and flow guides 26 in the illustrated embodiment, in other embodiments, the guide vanes may extend from, or be a part of, or be affixed to any suitable component.

In one form, the rotating and stationery inlet guide vanes are configured to direct cooling fluid into inlet ports 46 and 50 and to increase pressure in the cooling fluid in locations adjacent to inlet ports 46 and 50, in order to increase the flow of cooling fluid through passages 42 and 44, e.g., in a manner similar to compressor blades and vanes. The rotating and stationery discharge guide vanes are configured to decrease pressure in locations adjacent to discharge ports 48 and 52, in order to increase the amount of flow of cooling fluid through passages 42 and 44. For example, the discharge guide vanes may reduce discharge turbulence by shielding the discharge port from recirculation vortices and the like, and entrain the cooling fluid into the slipstream adjacent to the rotor, e.g., functioning in a manner similar to that of an ejector, for example, by generating a local rotating low pressure field at the locations of the discharge ports 48 and 52.

Figure 3:
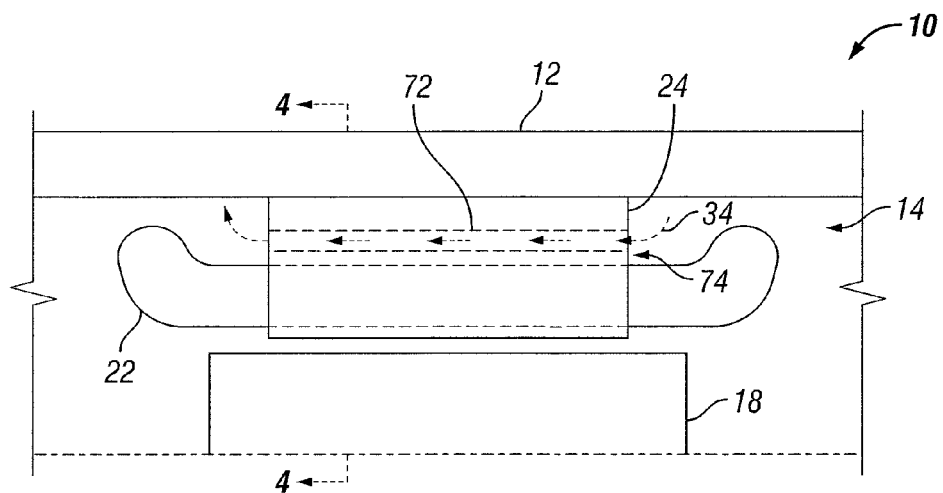
FIG. 3 schematically illustrates some aspects of a non-limiting example of an electrical machine stator in accordance with an embodiment of the present invention.
Figure 4:
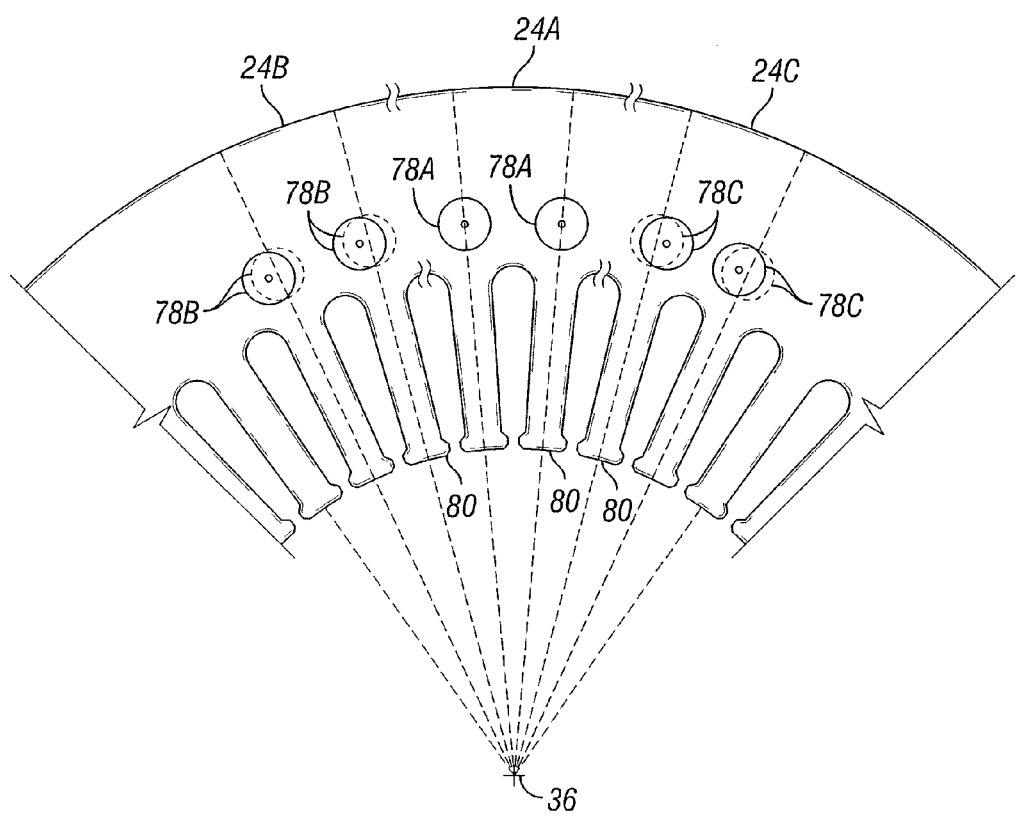
FIG. 4 schematically illustrates some examples of the formation of cooling passages of an electrical machine stator in accordance with embodiments of the present invention.
Figure 5:
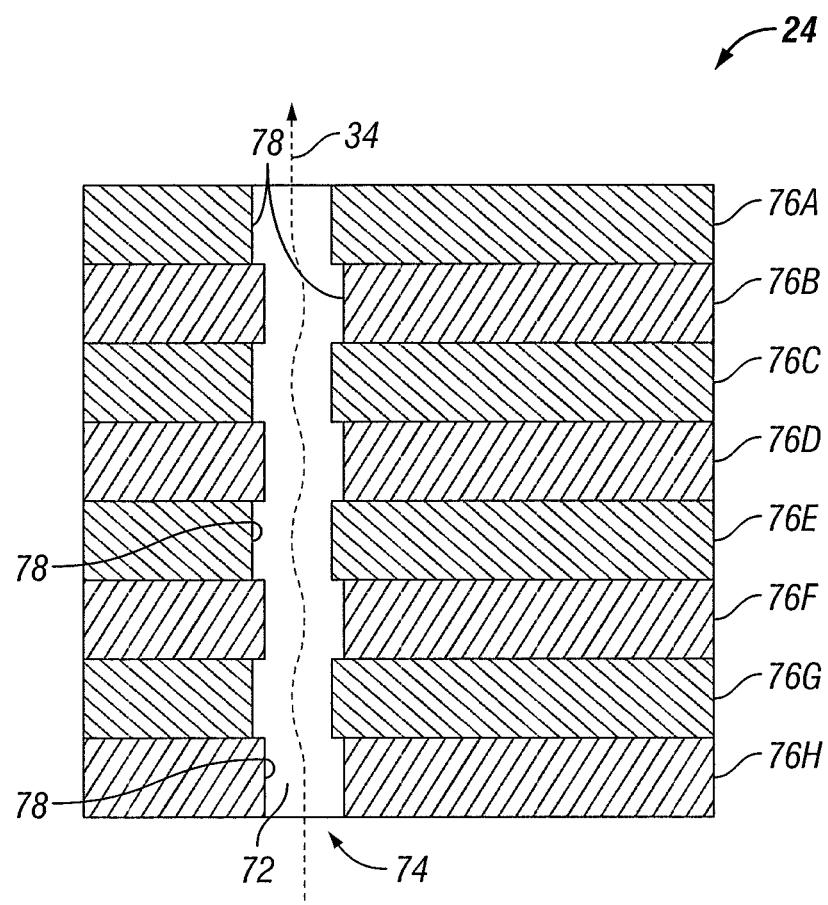
FIG. 5 schematically illustrates some aspects of a non-limiting example of a cooling passages of an electrical machine stator in accordance with an embodiment of the present invention.

Referring now to FIGS. 3-5, in some embodiments, stator 14, or more particularly, the stator core 24 or the stator core yoke of electrical machine 10, includes axial turbulated cooling passages 72 extending therethrough, for removing heat from stator core 24 during the operation of electrical machine 10 via the use of a cooling fluid, e.g., cooling fluid 34. For example, in some embodiments, discharge ports 48 and 52 are in fluid communication with cooling fluid inlet ports 74 of turbulated cooling passages 72, and provide a flow of cooling fluid 34 into and through turbulated cooling passages 72. In such embodiments, rotor 18 may be configured to provide cooling fluid 34 at a sufficient flow rate such that its temperature does not become undesirably high as it passes through rotor 18, hence allowing a desired amount of cooling of stator 14. In other embodiments, cooling fluid 34 may be cooled by a heat exchanger and/or one or more other heat absorbers prior to entry into turbulated cooling passages 72. In other embodiments, cooling fluid inlet ports 74 of turbulated cooling passages 72 may be in fluid communication with another source of pressurized cooling fluid in addition to or in place of cooling fluid pressurized by rotor 18.

In one form, turbulated cooling passages 72 are located near the stator slots, e.g., close to windings 22, so that the heat conduction distance is minimized. In one form, stator core 24 is formed of a plurality of laminations 76 that are stacked together, e.g., some of which are illustrated as laminations 76A-76H in FIG. 5. Openings in the laminations are aligned in a desired fashion to form the cooling passages through the cooling passages through the stator 24. In contrast to a smooth cooling passage, e.g., wherein the openings are substantially aligned, and wherein the alignment makes the cooling passage smooth, turbulated cooling passages 72 generate turbulence and increased convective heat transfer by misaligning at least some of the openings in the laminations so that turbulated cooling passages 72 are not smooth. For example, in various embodiments of the present invention, at least one or more openings 78 in laminations 76 are offset relative to other openings 78 in laminations 76 so as to form turbulated flowpaths for the cooling fluid (i.e., turbulated cooling passages 72), which increases the convective heat transfer from the walls of the turbulated cooling passages 72 to cooling fluid 34.

Although it may be possible to form turbulators by inserting wire spirals or inserting or forming other features into smooth cooling passages in order to provide turbulation, such additional features may increase cost, for example by requiring additional components or requiring additional manufacturing steps and/or assembly steps. Thus, it is desirable to have a turbulated passage that does not require additional components, and to have methods of forming the cooling passages that have little or no effect on the time and cost of manufacturing the stator core 24.

High-speed electrical machines are smaller in size compared to standard 50/60 Hz machines with the same power level. As a consequence, powerful cooling is desirable in high-speed electrical machines, since the loss density is often much higher than in conventional electrical machines. Some high-speed electrical machines, e.g., 100-600 kW electrical motors, may be cooled from the outer surface of the housing enclosing the stator core, which requires that the heat be conducted, e.g., from the windings, through the core yoke, the core-housing shrink fit, and the housing. However, this may not be feasible in some high-speed machines, because the heat to be removed is too high relative to the heat path cross-sectional area, which in some cases can lead to overheating. Overheating is of particular concern regarding the stator windings, where increased temperatures have a detrimental effect on the effective life of the electrical machine.

FIG. 4 depicts 3 different examples of stator cores 24A, 24B and 24C for purposes of describing two methods of forming turbulated passages 72. The stator cores are formed as laminations stacked together in such a way as to form a cooling passage. Stator core 24A with openings 78A represents a case wherein all openings 78 are in substantial alignment with each other and with stator teeth 80, thus forming a non-turbulated (smooth) cooling passage. The openings 78A in each lamination maintain the same alignment relative to stator teeth 80 as the openings 78A in the other laminations and/or the laminations all face in the same direction.

Stator core 24B with openings 78B represent a methodology of forming turbulated cooling passages 72, wherein the openings 78B in the laminations 76 are all offset from alignment relative to the stator teeth 80, and all openings 78B have the same angular or positional offset from stator teeth 80, in which case turbulated cooling passages 72 are formed by facing at least one of the laminations in a direction opposite to at least another of the laminations. In the view depicted in FIG. 5, under the methodology employed with regard to openings 78B, every lamination faces in the opposite direction of an adjacent lamination. In other embodiments, only one or some laminations may face oppositely than others. The combination of the offset of the openings, and the fact that the laminations face in opposite directions, generates the turbulating features that render passages 72 to be turbulated cooling passages.

Stator core 24C with openings 78C represent a methodology of forming turbulated cooling passages 72, wherein two different lamination geometries are used, e.g., wherein one lamination geometric configuration employs openings having a first angular or positional relationship relative to stator teeth 80, and another lamination geometric configuration employs openings having a second angular or positional relationship relative to stator teeth 80 that is different from the first angular or positional relationship. In the depiction of FIG. 4, each pair openings 78C in the first lamination geometric configuration are offset from alignment with stator teeth 80 in a direction towards each other, whereas each pair of openings 78C in the second lamination geometric configuration are offset from alignment with stator teeth 80 in a direction away from each other. Stated differently, every first opening 78C, circumferentially, is rotated about axis of rotation 36 in one direction, e.g., clockwise, and every second opening, circumferentially, is rotated in the opposite direction, e.g., anti-clockwise or counter-clockwise. It will be understood that any suitable variation in angular or positional relationship of the openings relative to stator teeth 80 as between the two lamination geometries may be employed. In some embodiments, more than two different lamination geometric configurations may be employed. In the example depicted in FIG. 5, under the methodology employed with regard to openings 78C, every adjacent lamination faces in the same direction. The combination of two or more lamination geometric configurations having different offsets of the openings relative to stator teeth 80 generates the turbulated cooling passages 72.

Embodiments of the present invention include an electrical machine rotor, comprising: a rotor configured for electromagnetic cooperation with a stator of an electrical machine and structured to rotate about an axis of rotation, wherein the rotor extends along the axis of rotation and includes a first cooling passage extending therethrough and having a first cooling fluid inlet port disposed at a first axial location along the axis of rotation, the first cooling passage also having a first cooling fluid discharge port in fluid communication with the first cooling fluid inlet port and disposed radially outward of the first cooling fluid inlet port at a second axial location spaced apart from the first axial location in a first axial direction along the axis of rotation, wherein the first cooling passage removes heat from the rotor during rotation of the rotor.

In a refinement, the first cooling passage extends linearly between the first cooling fluid inlet port and the first cooling fluid discharge port.

In another refinement, the electrical machine rotor further comprises a rotating and/or stationary guide vane disposed adjacent to the first cooling fluid inlet port, wherein the guide vane is configured to increase fluid pressure at the first cooling fluid inlet port.

In another refinement, the electrical machine rotor further comprises a rotating and/or stationary guide vane disposed adjacent to the first cooling fluid discharge port wherein the guide vane is configured to decrease fluid pressure at the first cooling fluid discharge port.

In still another refinement, the rotor includes a second cooling passage extending through the rotor; the second cooling passage has a second cooling fluid inlet port disposed at a third axial location along the axis of rotation; the second cooling passage has a second cooling fluid discharge port disposed at a fourth axial location along the axis of rotation; the second cooling fluid discharge port is spaced apart from the second cooling fluid inlet port in a second axial direction opposite the first axial direction; and the second cooling fluid discharge port is disposed radially outward of the second cooling fluid inlet port.

In yet still another refinement, the first and fourth axial positions are substantially the same axial position, and wherein the second and third axial positions are substantially the same axial position.

In a further refinement, the rotor has a first end and a second end, and wherein the first cooling fluid inlet port and the second cooling fluid discharge port are disposed at the first end; and wherein the second cooling fluid inlet port and the first cooling fluid discharge port are disposed at the second end.

In a yet further refinement, the first cooling fluid inlet port and the first cooling fluid discharge port are disposed at different circumferential positions; and the second cooling fluid inlet port and the second cooling fluid discharge port are disposed at different circumferential positions.

In a still further refinement, the rotor is an induction machine rotor or a synchronous machine rotor.

Embodiments of the present invention include an electrical machine, comprising: a stator; a rotor in electromagnetic cooperation with the stator; a shaft extending from the rotor; and a bearing structured to radially support the shaft and the rotor, wherein the shaft is structured to support the rotor and to rotate about an axis of rotation; wherein the rotor extends along the axis of rotation and includes a first cooling passage extending therethrough and having a first cooling fluid inlet port disposed at a first axial location along the axis of rotation, the first cooling passage also having a first cooling fluid discharge port in fluid communication with the first cooling fluid inlet port and disposed radially outward of the first cooling fluid inlet port at a second axial location spaced apart from the first axial location in a first axial direction along the axis of rotation, wherein the first cooling passage removes heat from the rotor during rotation of the rotor.

In a refinement, the rotor includes a second cooling passage extending therethrough and having a second cooling fluid inlet port disposed at a third axial location along the axis of rotation, the second cooling passage also having a second cooling fluid discharge port in fluid communication with the second cooling fluid inlet port and disposed radially outward of the second cooling fluid inlet port at a fourth axial location spaced apart from the third axial location in a second axial direction along the axis of rotation opposite the first axial direction, wherein the second cooling passage removes heat from the rotor during rotation of the rotor.

In another refinement, the first cooling fluid inlet port is disposed at a different circumferential position on the rotor than the first cooling fluid discharge port.

In yet another refinement, the stator includes a stator cooling passage extending through the stator.

In still another refinement, the stator is formed of a plurality of laminations stacked together, wherein each lamination includes an opening; wherein the openings in the laminations form the stator cooling passage; and wherein the stator cooling passage is a turbulated cooling passage.

In yet another refinement, the laminations include a plurality of stator teeth; wherein the openings have a same geometry; and the openings in all of the laminations have the same alignment relative to the stator teeth.

In a further refinement, the laminations include a plurality of stator teeth; and wherein at least some of the openings in the laminations have a different alignment relative to the stator teeth than others of the openings in the laminations.

In a yet further refinement, at least one of the laminations faces in a direction opposite to at least one of the other laminations.

In a still further refinement, the rotor includes a plurality of first cooling passages, and the first cooling passages are disposed at an angle relative to an outer surface of the rotor.

Embodiments of the present invention include an electrical machine, comprising: a stator, a rotor configured for electromagnetic cooperation with the stator; a shaft extending from the rotor; a bearing structured to radially support the shaft and the rotor; and means for cooling at least one of the rotor and the stator during rotation of the rotor.

In a refinement, the electrical machine includes means for cooling the rotor and means for cooling the stator; wherein the means for cooling the rotor includes means for pressurizing a fluid; and wherein the means for cooling the stator includes means for cooling the stator using the pressurized fluid.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An electrical machine rotor, comprising:
a rotor for electromagnetic cooperation with a stator of an electrical machine and structured to rotate about an axis of rotation, the electrical machine including a casing extending between opposite first and second end plates, the casing configured to house the stator and the rotor along with a shaft extending from the rotor and a bearing structured to radially support the shaft and the rotor, wherein the rotor extends along the axis of rotation and includes a first cooling passage extending therethrough and having a first cooling fluid inlet port disposed at a first axial location along the axis of rotation at or adjacent a first end face of the rotor, the first cooling passage also having a first cooling fluid discharge port in fluid communication with the first cooling fluid inlet port and disposed radially outward of the first cooling fluid inlet port at a second axial location at or adjacent a second end face of the rotor opposite the first end face, the second axial location being spaced apart from the first axial location in a first axial direction along the axis of rotation, wherein the first cooling passage removes heat from the rotor during rotation of the rotor, wherein the rotor includes a second cooling passage extending therethrough and having a second cooling fluid inlet port disposed at a third axial location along the axis of rotation at or adjacent the second end face of the rotor, the second cooling passage also having a second cooling fluid discharge port in fluid communication with the second cooling fluid inlet port and disposed radially outward of the second cooling fluid inlet port at a fourth axial location at or adjacent the first end face of the rotor, the fourth axial location being spaced apart from the third axial location in a second axial direction along the axis of rotation that is opposite the first axial direction, wherein the second cooling passage removes heat from the rotor during rotation of the rotor, the inlet ports at each of the first and second end faces being in communication with respective inlets through the casing with respective first and second cooling fluid supply passages in communication with respective ones of the inlet ports at respective ones of the first and second end faces, the first and second cooling fluid supply passages being defined between the rotor, the shaft, a respective one of first and second flow guides extending from the respective ones of the first and second end faces and the respective one of the first and second end plates, and the discharge ports at each of the first and second end faces being in communication with respective outlets through the casing with respective first and second cooling fluid exhaust passages in communication with respective ones of the discharge ports at respective ones of the first and second end faces, the first and second cooling fluid exhaust passages being defined outside the motor between the rotor, the stator, and the respective one of the first and second flow guides.

2. The electrical machine rotor of claim 1, wherein the first cooling passage extends linearly between the first cooling fluid inlet port and the first cooling fluid discharge port.

3. The electrical machine rotor of claim 1, further comprising a rotating and/or stationary guide vane disposed adjacent to the first cooling fluid inlet port, wherein the guide vane is configured to increase fluid pressure at the first cooling fluid inlet port.

4. The electrical machine rotor of claim 1, further comprising a rotating and/or stationary guide vane disposed adjacent to the first cooling fluid discharge port wherein the guide vane is configured to decrease fluid pressure at the first cooling fluid discharge port.

5. The electrical machine rotor of claim 1, wherein the first and fourth axial positions are substantially the same axial position, and wherein the second and third axial positions are substantially the same axial position.

6. The electrical machine rotor of claim 1, wherein the first cooling fluid inlet port and the second cooling fluid discharge port are each disposed at the first end face; and wherein the second cooling fluid inlet port and the first cooling fluid discharge port are each disposed at the second end face.

7. The electrical machine rotor of claim 1, wherein the first cooling fluid inlet port and the first cooling fluid discharge port are disposed at different circumferential positions; and wherein the second cooling fluid inlet port and the second cooling fluid discharge port are disposed at different circumferential positions.

8. The electrical machine rotor of claim 1, wherein the rotor is an induction machine rotor or a synchronous machine rotor.

9. An electrical machine, comprising:
a stator;
a rotor in electromagnetic cooperation with the stator;
a shaft extending from the rotor;
a bearing structured to radially support the shaft and the rotor;
a casing extending between opposite first and second end plates, the casing configured to house the stator, the rotor, the shaft, and the bearing; and
wherein the shaft is structured to support the rotor and to rotate about an axis of rotation; wherein the rotor extends along the axis of rotation and includes a first cooling passage extending therethrough and having a first cooling fluid inlet port disposed at a first axial location along the axis of rotation at or adjacent a first end face of the rotor, the first cooling passage also having a first cooling fluid discharge port in fluid communication with the first cooling fluid inlet port and disposed radially outward of the first cooling fluid inlet port at a second axial location at or adjacent a second end face of the rotor opposite the first end face, the second axial location being spaced apart from the first axial location in a first axial direction along the axis of rotation, wherein the first cooling passage removes heat from the rotor during rotation of the rotor, wherein the rotor includes a second cooling passage extending therethrough and having a second cooling fluid inlet port disposed at a third axial location along the axis of rotation at or adjacent the second end face of the rotor, the second cooling passage also having a second cooling fluid discharge port in fluid communication with the second cooling fluid inlet port and disposed radially outward of the second cooling fluid inlet port at a fourth axial location at or adjacent the first end face of the rotor, the fourth axial location being spaced apart from the third axial location in a second axial direction along the axis of rotation that is opposite the first axial direction, wherein the second cooling passage removes heat from the rotor during rotation of the rotor,
and further comprising first and second flow guides extending from respective ones of the first and second end faces, the inlet ports at each of the first and second end faces being in communication with respective inlets through the casing with respective first and second cooling fluid supply passages in communication with respective ones of the inlet ports at respective ones of the first and second end faces, the first and second cooing fluid supply passages being defined between the rotor, the shaft, the respective one of the first and second flow guides and the respective one of the first and second end plates, and the discharge ports at each of the first and second end faces being in communication with respective outlets through the casing with respective first and second cooling fluid exhaust passages in communication with respective ones of the discharge ports at respective ones of the first and second end faces, the first and second cooling fluid exhaust passages being defined outside the motor between the rotor, the stator, and the respective one of the first and second flow guides.

10. The electrical machine of claim 9, wherein the first cooling fluid inlet port is disposed at a different circumferential position on the rotor than the first cooling fluid discharge port.

11. The electrical machine of claim 9, wherein the stator includes a stator cooling passage extending through the stator.

12. The electrical machine of claim 11, wherein the stator is formed of a plurality of laminations stacked together, wherein each lamination includes an opening; wherein the openings in the laminations form the stator cooling passage; and wherein the stator cooling passage is a turbulated cooling passage.

13. The electrical machine of claim 12, wherein the laminations include a plurality of stator teeth; wherein the openings have a same geometry; and wherein the openings in all of the laminations have the same alignment relative to the stator teeth.

14. The electrical machine of claim 12, wherein the laminations include a plurality of stator teeth; and wherein at least some of the openings in the laminations have a different alignment relative to the stator teeth than others of the openings in the laminations.

15. The electrical machine of claim 12, wherein at least one of the laminations faces in a direction opposite to at least one of the other laminations.

16. The electrical machine of claim 9, wherein the rotor includes a plurality of first cooling passages, and wherein the first cooling passages are disposed at an angle relative to an outer surface of the rotor.

17. An electrical machine, comprising:
a stator,
a rotor configured for electromagnetic cooperation with the stator;
a shaft extending from the rotor;
a bearing structured to radially support the shaft and the rotor;
a casing extending between opposite first and second end plates, the casing configured to house the stator, the rotor, the shaft, and the bearing; and
means for cooling the rotor during rotation of the rotor, wherein the means for cooling includes air that is provided through a plurality of cooling passages extending through the rotor between opposite first and second end faces of the rotor, wherein a first portion of the plurality of cooling passages each include an inlet port at the first end face and a discharge port at the second end face, and a second portion of the plurality of cooling passages each include an inlet port at the second end face and a discharge port at the first end face, and further comprising first and second flow guides extending from respective ones of the first and second end faces, the inlet ports at each of the first and second end faces being in communication with respective inlets through the casing with respective first and second cooling fluid supply passages in communication with respective ones of the inlet ports at respective ones of the first and second end faces, the first and second cooling fluid supply passages being defined between the rotor, the shaft, the respective one of the first and second flow guides and the respective one of the first and second end plates, and the discharge ports at each of the first and second end faces being in communication with respective outlets through the casing with respective first and second cooling fluid exhaust passages in communication with respective ones of the discharge ports at respective ones of the first and second end faces, the first and second cooling fluid exhaust passages being defined outside the motor between the rotor, the stator, and the respective one of the first and second flow guides.

18. The electrical machine of claim 17, wherein the electrical machine includes means for cooling the stator; wherein the means for cooling the rotor includes means for pressurizing a fluid; and wherein the means for cooling the stator includes means for cooling the stator using the pressurized fluid.

\* \* \* \* \*